(12) United States Patent  (10) Patent No.: US 6,734,983 B2
Yoshida  (45) Date of Patent: May 11, 2004

(54) END POINT DETECTOR FOR ETCHING EQUIPMENT (75) Inventor: Masashi Yoshida, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 288 days.

(21) Appl. No.: 09/930,225

(22) Filed: Aug. 16, 2001

(65) Prior Publication Data

US 2002/0024678 A1 Feb. 28, 2002

(30) Foreign Application Priority Data

Aug. 22, 2000 (JP) ........................................ 2000-250571

(51) Int. Cl.⁷ .......................... G01B 11/28; G01B 11/14; G01L 21/30; B05C 11/00
(52) U.S. Cl. .......................... 356/630; 356/614; 219/60; 118/712
(58) Field of Search ................................. 356/630, 631, 356/632, 614, 622, 623; 156/345.24, 345.25; 118/712; 216/59, 60

(56) References Cited

U.S. PATENT DOCUMENTS 5,985,032 A * 11/1999 Eriguchi ..................... 118/712
6,165,334 A * 12/2000 Watanabe ............... 204/298.32
6,562,186 B1 * 5/2003 Saito et al. ............. 156/345.24

FOREIGN PATENT DOCUMENTS

JP 06-084838 3/1994
JP 11-150099 6/1999
JP 2000-199832 7/2000

* cited by examiner

Primary Examiner—David Gray
Assistant Examiner—D. Ben Esplin
(74) Attorney, Agent, or Firm—Volentine Francos, PLLC

(57) ABSTRACT

An end point detector for detecting the monitor light to control the operation of an etching process by the etching equipment based on changes in the monitor light supplied from plasma etching equipment. The end point detector includes a sensor body for detecting the monitor light and a collector barrel for guiding the monitor light from the etching equipment to the sensor body, wherein the collector barrel is detachable from the sensor body.

18 Claims, 5 Drawing Sheets

END POINT DETECTOR FOR ETCHING EQUIPMENT

FIELD OF THE INVENTION

The present invention relates to an end point detector suitable for manufacture of semiconductor devices and more particularly to an EPD (end point detector) suitable for use in plasma dry etching equipment as one component of semiconductor manufacturing equipment.

PRIOR ART

An example of the prior art in this field will be described in the following.

Figure 6:
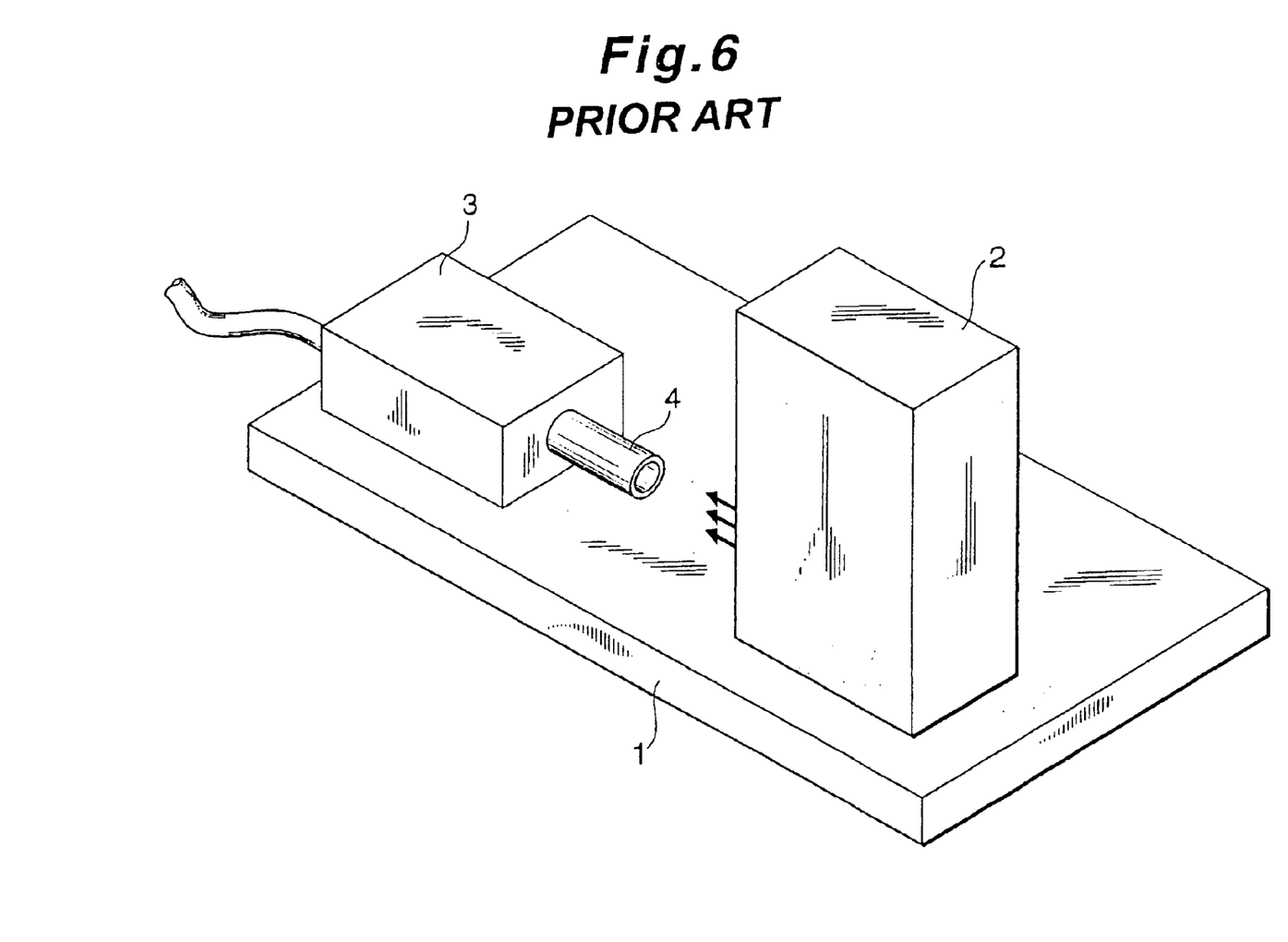
FIG. 6 is a configuration diagram of a conventional EPD sensor.

FIG. 6 shows a configuration diagram of a conventional end point detector.

In FIG. 6, reference mineral 1 denotes a base, 2 denotes a plasma dry etching equipment, 3 denotes a sensor body (EPD sensor) installed on the base, and 4 denotes a sensor collector barrel mounted to the sensor body 3.

As shown in FIG. 6, the conventional EPD comprises the sensor body (EPD) 3 disposed close to an inspection window, not shown, of the plasma dry etching equipment 2, and the collector barrel 4 formed fixedly to the sensor body. In the EPD 3, a monitor light emitted through the inspection window during etching is guided through the collector barrel 4 into the sensor body 3. The sensor body 3 detects changes in the monitor light due to changes in that part of the material of a work piece undergoing an etching process, and decides the end point of the etching work by the etching equipment based on changes in the monitor light.

As has been described, in order to secure high sensitivity and accuracy, the EPD sensor body needs to be installed close to the etching equipment. The sensor collector barrel is generally made of a resin for its better workability.

However, in the above-mentioned conventional EPD, the inner surface of the sensor collector barrel is affected by ultraviolet rays included in the monitor light or a reactive etching gas that leaks from the etching equipment at periodic dismantling inspection or the like over an extended period of use. Therefore, the monitor light passing through the collector barrel suffers scattering, with the result that the photodetector of the sensor body becomes unable to receive a normal quantity of light.

If, as a result, a deviation or an end point error occurs in etching end point decision, this can lead to discarding of a semiconductor wafer as an etching workpiece, which has become much of a problem.

In the conventional EPD having the collector barrel mounted fixedly to the EPD, if the collector barrel deteriorates as mentioned above, it is necessary to replace the whole EPD, which has been uneconomical and used to lead to reduced durability of the EPD.

An object of the present invention is to eliminate the above problem and provide an end point detector for etching equipment, which is free from deterioration of the EPD sensor collector barrel and excellent in durability.

Another object of the present invention is to provide an end point detector for manufacture of semiconductor devices, which detector is adapted to be able to adjust the quantity of light received.

Yet another object of the present invention is to provide an EPD, which has economical advantages and excellent durability.

SUMMARY OF THE INVENTION

According to the present invention, there is provided an end point detector for a plasma-utilized detecting a monitor light to control the operation of an etching process by the etching equipment based on changes in a monitor light emitted by the etching equipment, comprising a sensor body for detecting the monitor light, and a collector barrel for guiding the monitor light from the etching equipment to the sensor body, wherein the collector barrel is detachable from the sensor body.

The collector barrel may be formed of an etch-resistant material that does not react with an etching gas of the etching equipment.

The collector barrel may be formed of either carbon or a metal.

As the metal material mentioned above, aluminum covered on its surface with a layer of aluminum oxide may be used.

The collector barrel may have a shape such that the internal diameter gradually increases from a proximal end thereof as a connection to the sensor body to a distal end thereof.

The end point detector according to the present invention may further comprise a plurality of collector barrels, including the above-mentioned collector barrel. The plurality of collector barrels are selectively detachable from the sensor body, and may be selectively used to adjust the quantity of light received at the sensor body.

The plurality of collector barrels may differ in roughness of the internal circumferential surface.

The plurality of collector barrels may differ in internal diameter.

The plurality of collector barrels may differ in longitudinal length.

At least one of the plurality of collector barrels may increase in internal diameter gradually from a proximal end thereof as a connection to the sensor body to a distal end thereof.

The plurality of collector barrels may include at least two collector barrels with different rates of increase in internal diameter.

Another end point detector according to the present invention for detecting a monitor light to control the operation of an etching process by a plasma-utilized etching equipment based on changes in the monitor light emitted by the etching equipment, comprising a sensor body for detecting the monitor light, and a collector barrel for guiding the monitor light from the etching equipment to the sensor body, wherein the collector barrel is selectively detachable from the sensor body to adjust the quantity of light received at the sensor body.

DESCRIPTION OF THE EMBODIMENTS

Detailed description will be made of preferred embodiments of the present invention.

FIGS. 1(a) to 1(d) show process steps of replacing a sensor collector barrel of an end point detector according to a first embodiment of the present invention.

Figures 1A, 1B, 1C, 1D:
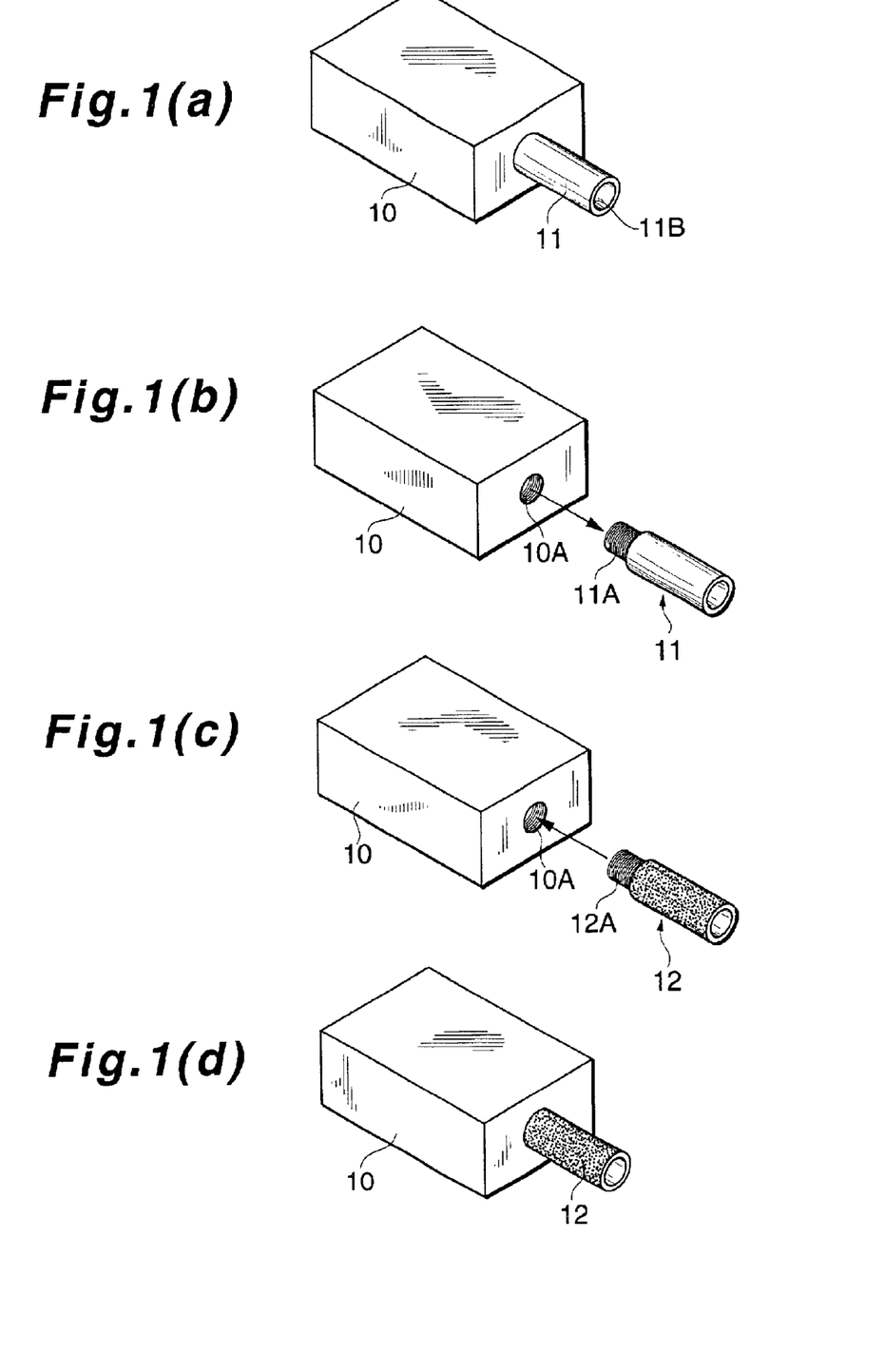
FIGS. 1(a) to 1(d) show process steps of replacing a sensor collector barrel of an end point detector according to a first embodiment of the present invention.

As shown in FIG. 1(a), the end point detector according to the present invention comprises a sensor body 10, and a sensor collector barrel 11 detachably connected to the sensor body.

The sensor body incorporates a well-known photodetector, not shown, and the sensor collector barrel 11 guides light, which enters from the distal end thereof, into the photodetector.

As shown in FIG. 1(b), an external thread part 11A is formed at the proximal end of the collector barrel, and an internal thread hole 10A, which engages the external thread part 11A, is formed in the sensor body 10. By engagement between the external and internal thread holes, the collector barrel 11 is releasably connected to the sensor body 10.

As shown in FIG. 6, the collector barrel 11 is disposed facing the inspection window to capture the monitor light from the window of the plasma dry etching equipment 2. The collector barrel 11 guides a monitor light that enters from the distal end thereof to the photodetector of the sensor body 10.

Since the monitor light contains ultraviolet rays, if the collector barrel 11 is formed of a synthetic resin material as it used to be, the internal circumferential surface 11B of the sensor collector barrel 11 is affected and deteriorates from use over an extended period of time. Further, the internal circumferential surface 11B of the collector barrel 11 deteriorates when exposed to the etching gas that leaks from the etching chamber of the etching equipment 2 at dismantling inspection or the like of the etching equipment.

When the internal circumferential surface 11B of the collector barrel 11 deteriorates, a scattered-off proportion of the monitor light being guided by the collector barrel increases, so that the quantity of monitor light reaching the photodetector decreases, resulting in decreased sensitivity of the sensor body.

When the decrease in sensor sensitivity falls below a specified value, in the end point detector according to the present invention, as shown in FIG. 1(b), by reversing the external thread part 11A of the sensor collector barrel 11 fastened to the internal thread hole 10A of the sensor body 10, the external thread part 11A can be screwed off the internal thread hole 10A.

Then, as shown in FIG. 1(c), by threading the external thread part 12A of a new sensor collector barrel 12, which is identical with the collector barrel 11, into the internal thread hole 10A, the sensor body 12 can be attached to the sensor body 10.

By following the above process steps, as shown in FIG. 1(d), the sensor body 10, in which the above-mentioned deterioration has occurred, need not be discarded, in other words, by replacing the deteriorated collector barrel 11 with a new collector barrel 12 of identical construction, the end point detector can be prevented from decreasing in sensitivity caused by the deterioration of the collector barrel 11. Therefore, the sensor body need not go to waste but can be utilized to the fullest. Essentially, the durability of the end point detector can be extended.

Description has been made of a case where the collector barrel 11 is replaced with a collector barrel 12 of identical construction.

Alternatively, the sensor collector barrel 12 may be formed of, instead of a conventional resin with better workability, a material invulnerable to damage from ultraviolet rays or a reactive gas of the plasma dry etching equipment, in other words, a material showing strong resistance to an etching gas. Or otherwise, a plurality of sensor collector barrels 12 may be formed respectively of materials with excellent resistance to different kinds of etching gas, and the collector barrels 12 made of suitable material may be selectively used or changed to suit the kind of etching gas used.

As the material for collector barrels 12, it is possible to use, for example, carbon or aluminum covered on the surface with Alumite (trademark), which is a layer of aluminum oxide immune to ultraviolet rays or a reactive etching gas of the plasma dry etching equipment 2. The collector barrels 12 may be selectively used to suit a reactive gas as described above.

For example, when an etching gas is used to etch a nitride film, to prevent the collector barrel from being affected by a fluorine gas included in the etching gas, a collector barrel made of Alumite is used. When an etching gas to etch polysilicon or aluminum is used, to protect the collector barrel against a fluorine gas included in the etching gas, a collector barrel made of Teflon resin is used.

By selecting one out of a plurality of sensor collector barrels 12 or changing one for another to suit the type of etching gas used, the following effects can be obtained.

(1) It is possible maintain compatibility with various kinds of etching gas.

(2) Because of ability to effectively prevent deterioration of the sensor collector barrel by selecting a collector barrel to suit the type of etching gas used, it is possible to secure a necessary quantity of monitor light for the sensor body 10 semi-permanently.

FIGS. 2(a) to 2(d) are process steps of replacing a sensor collector barrel according to a second embodiment of the present invention.

Figure 2A:
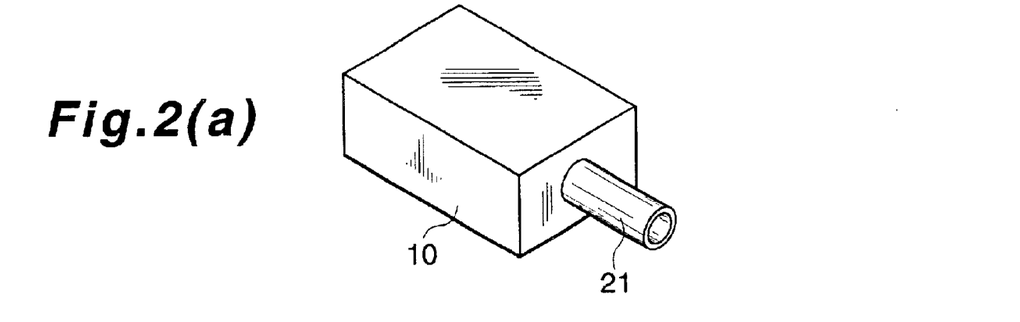
FIGS. 2(a) to 2(d) show process steps of replacing a sensor collector barrel of an end point detector according to a second embodiment of the present invention.

As shown in FIG. 2(a), as in the first embodiment, a sensor collector barrel 21 is detachably connected to the sensor body 10.

Figure 2B:
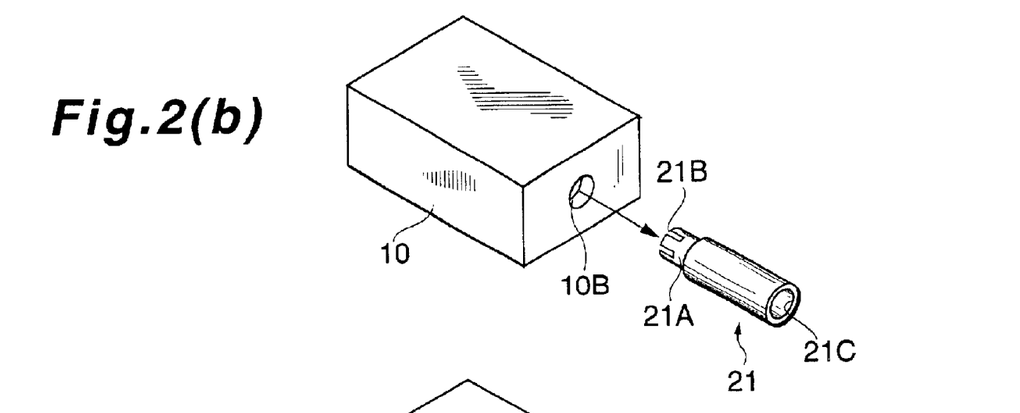

In the second embodiment, as shown in FIG. 2(b), instead of the external thread part 11A, a connector 21A having expanding slots 21B are provided at the proximal end of the collector barrel 21. Instead of the internal thread hole 10A, a connection hole 10B for accepting the connector 21A with the expanding slots 21B is provided in the sensor body 10.

When the collector barrel 21 is connected, the connector with the expanding slots 21B, that is, the expanding slot portion is press-fit into the connection hole 10B of the sensor body 10.

When adjusting the quantity of the monitor light received by the photodetector of the sensor body 10, if it is necessary to change the roughness of the internal circumferential surface of the sensor collector barrel 21, the sensor collector barrel 21 is changed to one with a different surface roughness.

To make this change, as shown in FIG. 2(b), the connector 21A of the sensor collector barrel 21 connected to the connection hole 10B is pulled out of the connection hole 10B, by which the collector barrel 21 is detached from the sensor body 10. In this example, as has been described, since the expanding slots 21B are formed in the connector 21A of the sensor collector barrel 21, the connector 21A is, by its elasticity, press-fit into the connection hole 10B. Therefore, the collector barrel 21 can be pulled out of the sensor body 10 relatively easily.

Figure 2C:
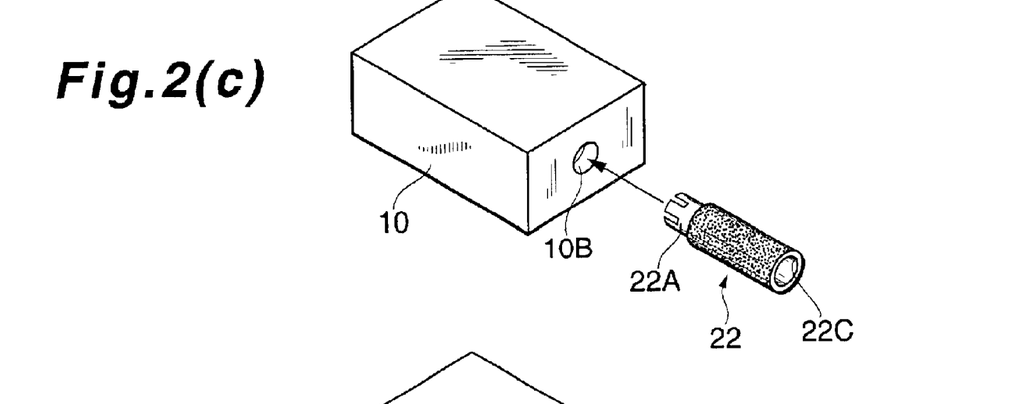
Figure 2D:
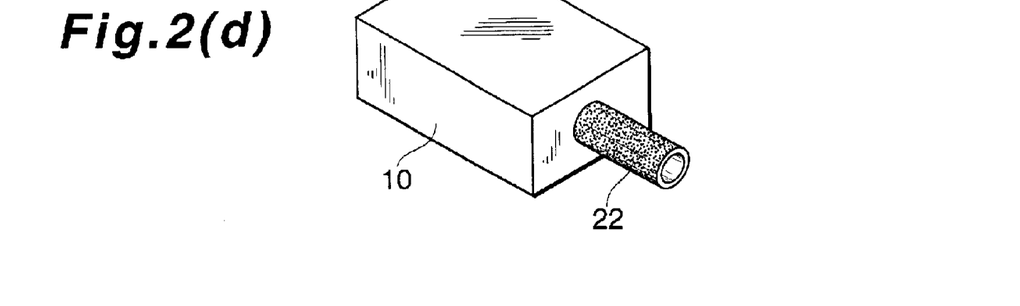

As shown in FIG. 2(c), a sensor collector barrel 22, which has an internal circumferential surface 22C with a surface roughness different from that of the internal circumferential surface 21C of the collector barrel 21, is selected to be connected to the sensor body 10. In other words, when it is necessary to increase the quantity of light, a collector barrel 22 having the internal circumferential surface 22C with a surface roughness lower than the surface roughness 21C is selected. On the other hand, to decrease the light quantity, a collector barrel 22 having the internal circumferential surface 22C with a roughness higher than the surface roughness 21C is selected. The collector barrels 21 and 22 respectively have connectors 21A and 22A of the same size. When the collector barrel 21 is replaced, as shown in FIG. 2(c), the connector 22A of a selected collector barrel 22 is press-fit snugly into the connection hole 10B of the sensor body 10, by which the collector barrel 22 is fixed to the sensor body 10 as shown in FIG. 2(d).

According to the second embodiment, when the intensity of the monitor light by plasma light emission, for example, is too high and an appropriate range of light quantity received at the photodetector of the EPD is exceeded, the current collector barrel is replaced by a collector barrel with a larger roughness of the internal circumferential surface to decrease the received light quantity of the sensor body, by which it becomes possible to obtain an optimum light quantity received.

Conversely, if the intensity of the monitor light by plasma light emission is too weak, the current collector barrel is replaced by a collector barrel with a smaller roughness of the internal circumferential surface to increase the received light quantity of the sensor body 10, by which it becomes possible to obtain an optimum light quantity received.

FIGS. 3(a) to 3(d) show process steps of replacing the end point detector according to a third embodiment of the present invention.

Figure 3A:
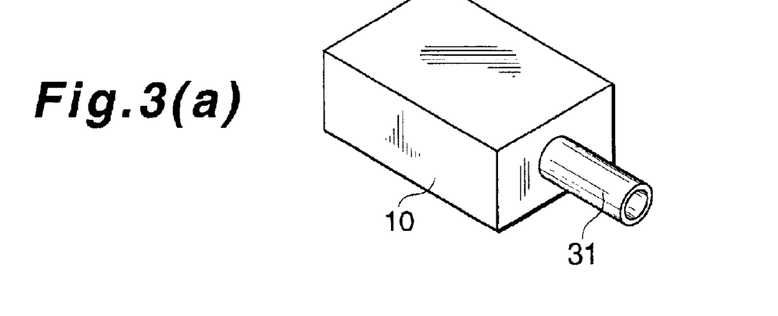
FIGS. 3(a) to 3(d) show process steps of replacing a sensor collector barrel of an end point detector according to a third embodiment of the present invention.

As shown in FIG. 3(a), a sensor collector barrel 31 is detachably mounted to the sensor body 10 just like in the first and the second embodiments.

Figure 3B:
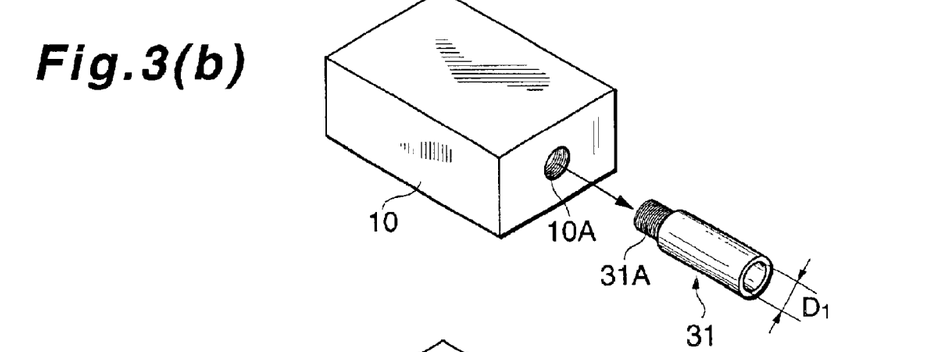

In the third embodiment, as shown in FIG. 3(b), a connector 31A having an external thread part is fromed at the proximal end of the collector barrel 31. An internal thread hole 10A is formed in the sensor body 10.

When adjusting the quantity of monitor light received by the photodetector of the sensor body 10, if it is necessary to change the internal diameter of the sensor collector barrel 31, the current sensor collector barrel 31 is replaced by one with an internal diameter different from that of the collector barrel 31.

To make this change, as shown in FIG. 3(b), by reversing the sensor collector barrel 31, which has its external thread part 31A connected to the internal thread hole 10A of the sensor body 10, the sensor collector barrel 31 is detached from the sensor body 10.

Figure 3C:
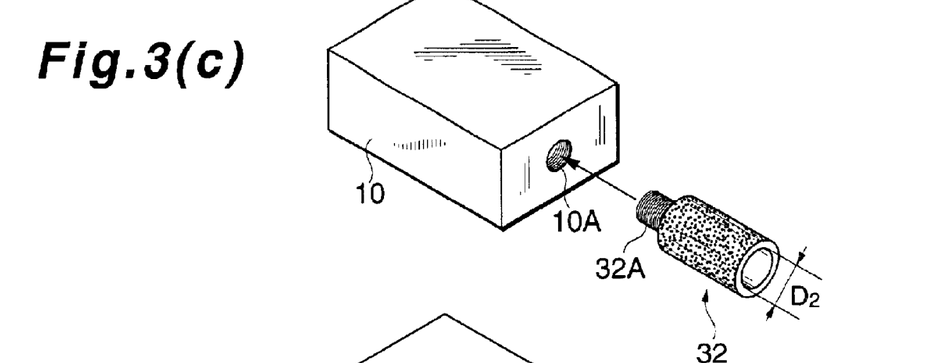

For the sensor body 10, from which the collector barrel 31 has been removed, as shown in FIG. 3(c), a new sensor collector barrel 32 is selected, which has an internal diameter D2 different from the internal diameter D1 of the collector barrel 31.

The collector barrel 32 has the external thread part 32A of the same size as the external thread part 31A of the collector barrel 31, but its cylindrical main body, excepting the external thread part 32A, has an internal diameter D2 different from the internal diameter D1 of the collector barrel 31. In other words, in this example, it is possible to selectively use the collector barrels 31 and 32, which differ in internal diameter.

When it is necessary to increase the quantity of light, a collector barrel 32 is selected, which has an internal diameter D2 larger than the internal diameter D1 of the collector barrel 31. Conversely, when the light quantity needs to be decreased, a collector barrel 32 is selected, which has an internal diameter D2 smaller than the internal diameter D1 of the collector barrel 31.

Figure 3D:
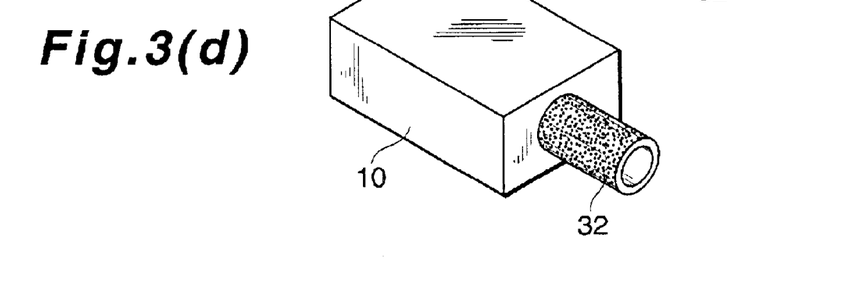

In replacement by a collector barrel 32, as shown in FIG. 3(c), the connector, or the external thread part 32A of the selected collector barrel 32 is screwed into the internal thread hole 10A, by which the collector barrel 32 is fixed to the sensor body 10 as shown in FIG. 3(d).

The connection of the sensor body 10 with the collector barrel 31 or 32 may be by press-fitting as shown in FIGS. 2(a) to 2(d) instead of screwing mentioned above.

When it is not easy to roughen the internal surface of the collector barrel because of its material, for example, and also when there is a limitation on the length of the collector barrel, if the quantity of light received needs to be adjusted, because, according to the third embodiment, the collector barrel can be changed to one with a different internal diameter, a collector barrel with a different internal diameter is used in place of the current collector barrel, by which the quantity of light received can be adjusted to an optimum value, for greater effects.

Figures 4A, 4B:
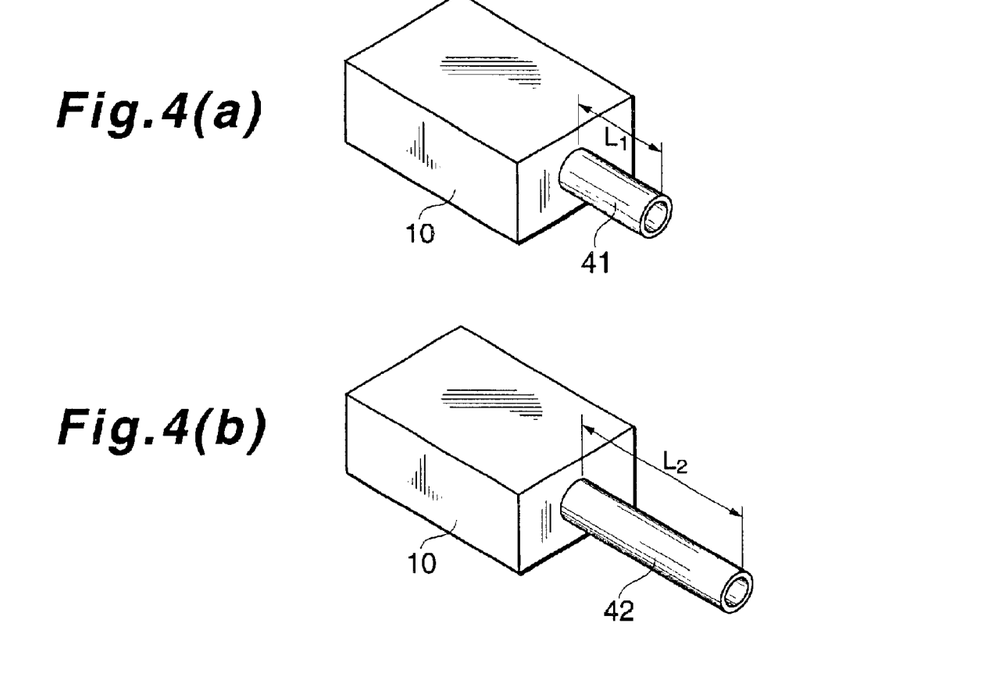
FIGS. 4(a) and 4(b) show process steps of replacing a sensor collector barrel of an end point detector according to a fourth embodiment of the present invention.

FIGS. 4(a) and 4(b) show process steps of replacing the sensor collector barrel of the end point detector according to a fourth embodiment of the present invention.

In this fourth embodiment, as shown in FIG. 4(a), the sensor collector barrel 41 is detachably mounted to the sensor body 10 as described above.

To adjust the light quantity received at the sensor body 10, if it is necessary to change the length of the sensor collector barrel, the sensor collector barrel 41 is changed to one with a different length. Even in this case, by screwing or connecting as mentioned above, as shown in FIG. 4(b), the collector barrel 41 can be replaced by a new collector barrel 42, which has a length L2 different from the length L1 of the collector barrel 41.

According to the fourth embodiment, when it is not easy to roughen the internal surface of the collector barrel because of its material, for example, and also when there is a limitation on the size in the diameter direction of the sensor collector barrel, if it is necessary to adjust the light quantity received, the light quantity received can be adjusted by changing the current collector barrel to one with a different length, for which reason the light quantity received can be adjusted to an optimum value, for greater effects.

When the intensity of the monitor light from the inspection window is weak and the light quantity received at the photodetector of the sensor body 10 is to be increased, a collector barrel 41 with a relatively short length L1 is used. On the contrary, when the intensity of the monitor light is strong and the light quantity received at the sensor body 10 is to be decreased, a collector barrel 42 with a length greater than that of the collector barrel 41 is used.

Figures 5A, 5B:
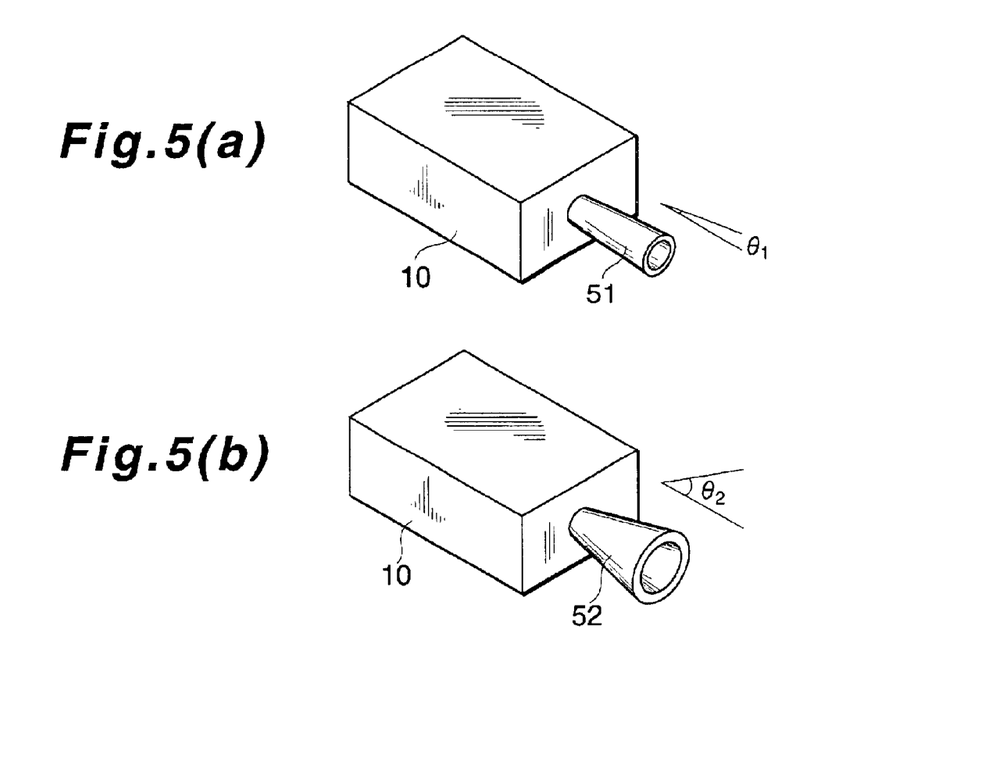
FIGS. 5(a) and 5(b) show process steps of replacing a sensor collector barrel of an end point detector according to a fifth embodiment of the present invention.

FIGS. 5(a) and 5(b) show process steps of replacing the collector barrel of the end point detector according to a fifth embodiment of the present invention.

In this embodiment, as shown in FIG. 5(a), a sensor collector barrel 51 is detachably mounted to the sensor body 10 as in the first to fourth embodiments.

The sensor collector barrel 51 has the same connector as has been discussed in the first or second embodiment. The barrel body that extends from the connector increases in diameter as one goes from the connector as the proximal end toward the distal end so that a taper angle $\theta_1$ is formed.

As the taper angle increases, the opening diameter at the distal end of the collector barrel increases so long as the length of the collector barrel remains the same, with the result that the quantity of the monitor light that enters from the inspection window increases. Therefore, to adjust the quantity of light received by the sensor body 10, the sensor collector barrel 51 can be replaced by one with a more desirable shape.

A collector barrel 52 shown in FIG. 5(b) has a connector, not shown, of the same size as that of the collector barrel 51, and can be mounted to the sensor body 10 by screwing or connecting it as shown in FIG. 5(b). The collector barrel 52, like the collector barrel 51, gradually increases in diameter as one moves from the proximal end toward the distal end, but the rate of increase is greater than that of the collector barrel 51 so that the taper angle 2 is greater than the taper angle 1 of the collector barrel 51.

The collector barrel 52, which has a taper angle different from that of the collector barrel 51, can be mounted to replace the collector barrel 51 by means of the connector mentioned above.

According to the fifth embodiment, when it is not easy to roughen the internal surface of the collector barrel because of its material, for example, and also when it is necessary to adjust the received quantity of monitor light in the sensor body 10, collector barrels of a multiple choice of taper in this embodiment will produce remarkable effects. When the intensity of the monitor light is weak and the light quantity received at the photodetector is to be increased, a collector barrel with a large taper angle is used. On the contrary, when the intensity of the monitor light is strong and the light quantity received at the photodetector is to be decreased, a collector barrel with a small taper angle is used. By selecting a desired collector barrel, it is possible to adjust the received light quantity to an optimum value.

According to the present invention, possible applications are as follows.

In the first embodiment, when the collector barrel is degraded by ultraviolet rays, a corrosive gas or the like and abnormality occurs in an end point decision in the EPD, this problem can be solved by changing the material of the collector barrel according to the present invention to suit the kind of etching gas.

In the first to fifth embodiments, if the monitor light quantity required for end point decision in the EPD is off an adequate value during an etching operation, an EPD end point decision can be carried out properly by selectively mounting a collector barrel suitable for the shape of the etching chamber of the etching equipment or according to the kind of etching gas, based on the present invention.

In the foregoing, description has been made of examples in which the internal surface roughness, internal diameter, length or taper angle of the collector barrel is changed independently of the other factors, but those factors may be used in combinations as you think suitable.

The present invention can be applied to EPD for various kinds of etching equipment that use a plasma gas.

The present invention is not limited to the embodiments set forth herein, but may be embodied in different forms without departing the spirit of the present invention and are not excluded from the scope of the present invention.

As has been described in detail, according to the present invention, the following effects can be achieved.

(A) The EPD sensor collector barrel is prevented from being affected by an etching gas of a plasma dry etching equipment, and the light quantity received can be adjusted easily.

(B) The present invention is applicable to etching chambers and etching gases of various kinds of plasma etching equipment. A stable light quantity can be obtained semi-permanently from a monitor light by changing the material of the sensor collector barrel.

(C) When the intensity of the monitor light of plasma light emission is too strong and an EPD control range is exceeded, the collector barrel may be changed to, for example, one with a larger roughness of internal surface to reduce the light quantity received and further to obtain an optimum light quantity.

(D) When it is difficult to roughen the internal surface of the collector barrel because of its material, for example, and also when there is a limitation on the length of the collector barrel, if it is necessary to adjust the received light quantity, a plurality of collector barrels of different internal diameters may be selectively used to adjust the received light quantity to an optimum level.

(E) When it is difficult to roughen the internal surface of the collector barrel because of the material or the like of the sensor collector barrel, and also when there is a limitation on the size in the diameter direction of the sensor collector barrel, if it is necessary to adjust the received light quantity, a plurality of collector barrels of different lengths may be selectively used to adjust the received light quantity to an optimum level.

(F) When it is difficult to roughen the internal surface of the collector barrel because of the material or the like of the sensor collector barrel, if it is necessary to adjust the received light quantity, a plurality of collector barrels of different taper angles may be selectively used to adjust the received light quantity to an optimum level.

By combining above means, it becomes possible to handle a wide variety of etching gas, obtain a stable light quantity from a monitor light by plasma light emission and adjust the received light quantity easily.

What is claimed is:

1. For use with a plasma-utilized etching equipment, an end point detector for detecting a monitor light to control an operation of an etching process by the etching equipment based on changes in the monitor light emitted by the etching equipment, the end point detector comprising:

a sensor body for detecting the monitor light; and a plurality of collector barrels for guiding the monitor light from the etching equipment to said sensor body, wherein said collector barrels are detachable from said sensor body, wherein said plurality of collector barrels are selectively detachable from said sensor body and selectively used to adjust a quantity of light received at said sensor body.

2. An end point detector according to claim 1, wherein at least one of said collector barrels is formed of an etch-resistant material that does not react with an etching gas of the etching equipment.

3. An end point detector according to claim 2, wherein said at least one collector barrel is formed of either carbon or a metal.

4. An end point detector according to claim 3, wherein said metal material is aluminum covered on a surface thereof with a layer of aluminum oxide.

5. An end point detector according to claim 2, wherein said at least one collector barrel has a shape such that an internal diameter gradually increases from a proximal end thereof to a distal end thereof.

6. An end point detector according to claim 1, wherein said plurality of collector barrels have different respective roughness of an internal circumferential surface.

7. An end point detector according to claim 1, wherein said plurality of collector barrels have different respective internal diameter.

8. An end point detector according to claim 1, wherein said plurality of collector barrels have different respective length.

9. An end point detector according to claim 1, wherein at least one of said plurality of collector barrels has an internal diameter that gradually increases from a proximal end thereof as a connection to said sensor body to a distal end thereof.

10. An end point detector according to claim 9, wherein said plurality of collector barrels include at least two collector barrels having internal diameters that increase at respective different rates.

11. An end point detection method for use with etching equipment, that detects a monitor light emitted by the etching equipment to control operation of an etching process by the etching equipment based on changes of the monitor light, the end point detection method comprising:

providing a sensor body having a sensor therein that detects the monitor light;

providing a plurality of collector barrels having respectively different physical characteristics that are detachably mountable to the sensor body for guiding the monitor light to the sensor;

selecting one of the plurality of collector barrels having a physical characteristic suitable for a particular etching process; and detachably mounting the selected one of the plurality of collector barrels to the sensor body.

12. The end point detection method of claim 11, wherein the plurality of collector barrels have respectively different lengths, said selecting comprising selection of a collector barrel having length suitable for the particular etching process.

13. The end point detection method of claim 11, wherein the plurality of collector barrels have respectively different internal diameters, said selecting comprising selection of a collector barrel having internal diameter suitable for the particular etching process.

14. The end point detection method of claim 13, wherein the internal diameters of the plurality of collection barrels gradually increase from first ends thereof that are mounted to the sensor body, to second ends thereof remote from the sensor body, at respectively different rates.

15. The end point detection method of claim 11, wherein the plurality of collector barrels have respectively different internal surface roughnesses, said selecting comprising selection of a collector barrel having internal surface roughness suitable for the particular etching process.

16. The end point detection method of claim 11, wherein the plurality of collector barrels are made of respectively different materials, said selecting comprising selection of a collector barrel that is made of material suitable for the particular etching process.

17. The end point detection method of claim 11, wherein the etching process is a plasma etching process.

18. The end point detection method of claim 11, wherein said selecting comprises selection of a collector barrel so that a desired quantity of light is guided to the sensor for the particular etching process.

* * * * *